United States Patent Office 3,842,118
Patented Oct. 15, 1974

3,842,118
15-METHOXY PGE$_2$
Frank H. Lincoln, Jr., Portage, Mich., assignor to The
Upjohn Company, Kalamazoo, Mich.
No Drawing. Original application May 4, 1971, Ser. No.
140,252, now Patent No. 3,781,325. Divided and this
application Jan. 26, 1973, Ser. No. 326,643
Int. Cl. C07c 61/36, 69/74
U.S. Cl. 260—468 D                          4 Claims

ABSTRACT OF THE DISCLOSURE

Prostaglandin E$_2$-type and F$_{2\alpha}$-type compounds with a methoxy group replacing the hydroxyl at the C–15 position are disclosed. These are useful for the same pharmacological purposes as the unsubstituted prostaglandins.

This is a division of application Ser. No. 140,252, filed May 4, 1971, now Pat. No. 3,781,325.

DESCRIPTION OF THE INVENTION

This invention relates to compositions of matter, and to methods and intermediates for producing them. In particular, the several aspects of this invention relate to novel analogs of some of the known prostaglandins, specifically prostaglandin E$_2$ (PGE$_2$) and prostaglandin F$_2$ alpha (PGF$_{2\alpha}$), to novel methods for producing those novel prostaglandin analogs, and to novel chemical intermediates useful in those novel methods.

Each of the above-mentioned known prostaglandins is a derivative of prostanoic acid which has the following structure and atom numbering:

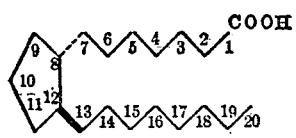

A systematic name for prostanoic acid is 7-[(2$\beta$-octyl)cyclopent-1$\alpha$-yl]heptanoic acid.

PGE$_2$ has the following structure:

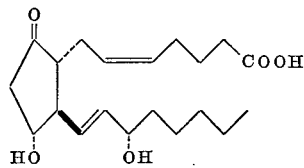

PGF$_{2\alpha}$ has the following structure:

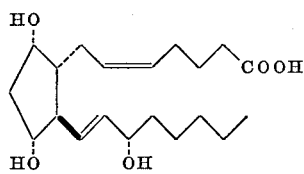

The prostaglandin formulas mentioned above each have several centers of asymmetry. Each formula represents a molecule of the particular optically active form of the prostaglandin obtained from certain mammalian tissues, for example, sheep vesicular glands, swine lung, and human seminal plasma, or by reduction or dehydration of a prostaglandin so obtained. See, for example, Bergstrom et al., Pharmacol. Rev. 20, 1 (1968), and references cited therein. The mirror image of each formula represents a molecule of the other enantiomeric form of that prostaglandin. The racemic form of the prostaglandin consists of equal numbers of two types of molecules, one represented by one of the above formulas and the other represented by the mirror image of that formula. Thus, both formulas are needed to define a racemic prostaglandin. See Nature 212, 38 (1966) for discussion of the stereochemistry of the prostaglandins. For convenience hereinafter, use of the terms "PGE$_2$" and "PGF$_{2\alpha}$" will mean the optically active form of that prostaglandin with the same absolute configuration as PGE$_2$ obtained from mammalian tissues. When reference to the racemic form of either of these prostaglandins is intended, the word "racemic" will precede the prostaglandin name, thus, "racemic PGE$_2$" or "racemic PGF$_{2\alpha}$."

In the formulas given above, as well as in the formulas given hereinafter, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring.

The novel 15-methyl ethers of the prostaglandin E$_2$ and F$_{2\alpha}$ compounds of this invention are represented by Formulas I and II, respectively, or by the combination of each formula with its mirror image:

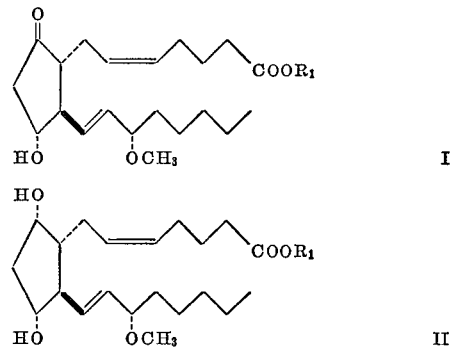

In Formulas I and II, R$_1$ is hydrogen, alkyl of one to 8 carbon atoms, inclusive, or a pharmacologically acceptable cation. For example, when R$_1$ is hydrogen, Formula I represents PGE$_2$, 15-methyl ether, and likewise Formula II represents PGF$_{2\alpha}$, 15-methyl ether. When R$_1$ is methyl, Formula I represents PGE$_2$, methyl ester, 15-methyl ether, and likewise Formula II represents PGF$_{2\alpha}$ methyl ester, 15-methyl ether. When R$_1$ is sodium, Formulas I and II represent the respective sodium salts.

This invention, then, relates to an optically active compound of the formula

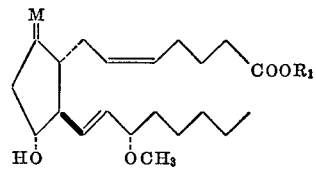

or a racemic compound of that formula and the mirror image thereof, wherein M is O= or

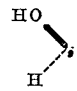

and $R_1$ is hydrogen, alkyl of one to 8 carbon atoms, inclusive, or a pharmacologically acceptable cation.

With regard to Formulas I and II, above, examples of alkyl of one to 8 carbon atoms, inclusive, are methyl, ethyl, propyl, butyl, pentyl, hexyl, heptyl, octyl, and isomeric forms thereof.

Like the natural prostaglandins described above, these novel 15-methyl ethers of $PGE_2$ and $PGF_{2\alpha}$ contain several centers of asymmetry. As in the case of the formulas representing the prostaglandins, Formulas I and II are intended to represent optically active prostanoic acid analogs with the same absolute configuration as $PGE_2$ obtained from mammalian tissues. The novel prostanoic acid derivatives of this invention also include the correspondig racemic compounds. For example, Formula I plus its mirror image are necessary in combination to describe the racemic $PGE_2$ compounds. For convenience hereinafter, when the word "racemic" preceds the name of one of the novel prostanoic acid derivatives of this invention, the intent is to designate a racemic compound represented by the combination of the appropriate Formula I or Formula II and the mirror image of that formula. When the word "racemic" does not precede the compound name, the intent is to designate an optically active compound represented only by the appropriate Formula I or Formula II and with the same absolute configuration as $PGE_2$ obtained from animal tissues.

$PGE_2$, and $PGF_{2\alpha}$, and their esters and pharmacologically acceptable salts, are extremely potent in causing various biological responses. For that reason, these compounds are useful for pharmacological purposes. See, for example, Bergstrom et al., Pharmacol. Rev. 20, 1 (1968), and references cited therein. A few of those biological responses are systemic arterial blood pressure lowering in the case of the PGE compounds as measured, for example, in anesthetized (pentobarbital sodium) pentolinium-treated rats with indwelling aortic and right heart cannulas; pressor activity, similarly measured, for the $PGF_\alpha$ compounds; stimulation of smooth muscle as shown, for example, by tests on strips of guinea pig ileum, rabbit duodenum, or gerbil colon; potentiation of other smooth muscle stimulants; antilipolytic activity as shown by antagonism of epinephrine-induced mobilization of free fatty acids or inhibition of the spontaneous release of glycerol from isolated rat fat pads; inhibition of gastric secretion in the case of the PGE compounds as shown in dogs with secretion stimulated by food or histamine infusion; activity on the central nervous system; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen; and in the case of the PGE compounds, stimulation of epidermal proliferation and keratinization as shown when applied in culture to embryonic chick and rat skin segments.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds, and especially the PGE compounds, are useful in mammals, including man, as nasal decongestants. For this purpose, the compounds are used in a dose range of about 10 $\mu$g. to about 10 mg. per ml. of a pharmacologically suitable liquid vehicle or as an aerosol spray, both for topical application.

The PGE compounds are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 $\mu$g. to about 500 $\mu$g. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

The PGE and $PGF_\alpha$ compounds are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.005 to about 20 mg. per kg. of body weight per day are used, the exact dose depending on the age, weight, and condition of the patient or animal, and on the frequency and route of administration.

The PGE and $PGF_\alpha$ compounds are especially useful as additives to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about .001 to 10 mg. per liter of circulating fluid. It is especially useful to use these compounds in laboratory animals, e.g., cats, dogs, rabbits, monkeys, and rats, for these purposes in order to develop new methods and techniques for organ and limb transplants.

PGE compounds are extremely potent in causing stimulation of smooth muscle, and are also highly active in potentiating other known smooth muscle stimulators, for example, oxytocic agents, e.g., oxytocin, and the various ergot alkaloids including derivatives and analogs thereof. Therefore, $PGE_2$, for example, is useful in place of or in combination with less than usual amounts of these known smooth muscle stimulators, for example, to relieve the symptoms of paralytic ileus, or to control or prevent atonic uterine bleeding after abortion or delivery, to aid in expulsion of the placenta, and during the puerperium. For the latter purpose, the PGE compound is administered by intravenous infusion immediately after abortion or delivery at a dose in the range about 0.01 to about 50 $\mu$g. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

The PGE compounds are useful as hypotensive agents to reduce blood pressure in mammals, including man. For this purpose, the compounds are administered by intravenous infusion at the rate about 0.01 to about 50 μg. per kg. of body weight per minute, or in single or multiple doses of about 25 to 500 μg. per kg. of body weight total per day.

The PGE and PGF$_a$ compounds are useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose of 0.01 to 50 μg. per kg. of body weight per minute until or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The PGE and PGF$_a$ compounds are useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, PGF$_{2a}$, for example, is administered systemically at a dose level in the range 0.01 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

As mentioned above, the PGE compounds are potent antagonists of epinephrine-induced mobilization of free fatty acids. For this reason, this compound is useful in experimental medicine for both in vitro and in vivo studies in mammals, including man, rabbits, and rats, intended to lead to the understanding, prevention, sympton alleviation, and cure of diseases involving abnormal lipid mobilization and high free fatty acid levels, e.g., diabetes mellitus, vascular diseases, and hyperthyroidism.

The PGE compounds promote and accelerate the growth of epidermal cells and keratin in animals, including humans, useful domestic animals, pets, zoological specimens, and laboratory animals. For that reason, these compounds are useful to promote and accelerate healing of skin which has been damaged, for example, by burns, wounds, and abrasions, and after surgery. These compounds are also useful to promote and accelerate adherence and growth of skin autografts, especially small, deep (Davis) grafts which are intended to cover skinless areas by subsequent outward growth rather than initially, and to retard rejection of homografts.

For these purposes, these compounds are preferably administered topically at or near the site where cell growth and keratin formation is desired, advantageously as an aerosol liquid or micronized powder spray, as an isotonic aqueous solution in the case of wet dressings, or as a lotion, cream, or ointment in combination with the usual pharmaceutically acceptable diluents. In some instances, for example, when there is substantial fluid loss as in the case of extensive burns or skin loss due to other causes, systemic administration is advantageous, for example, by intravenous injection or infusion, separate or in combination with the usual infusions of blood, plasma, or substitutes thereof. Alternative routes of administration are subcutaneous or intramuscular near the site, oral sublingual, buccal, rectal, or vaginal. The exact dose depends on such factors as the route of administration, and the age, weight, and condition of the subject. To illustrate, a wet dressing for topical application to second and/or third degree burns of skin area 5 to 25 square centimeters would advantageously involve use of an isotonic aqueous solution containing 5 to 1000 μg./ml. of the PGE compound. Especially for topical use, these prostaglandins are useful in combination with antibiotics, for example, gentamycin, neomycin, polymycin B, bacitracin, spectinomycin, and oxytetracycline, with other antibacterials, for example, mafenide hydrochloride, sulfadiazine, furazolium chloride, and nitrofurazone, and with corticoid steroids, for example, hydrocortisone, prednisolone, methylprednisolone, and fluprednisolone, each of those being used in the combination at the usual concentration suitable for its use alone.

The novel 15-methyl ethers of PGE$_2$ and PGF$_{2a}$ compounds each cause the biological responses described above for the PGE and PGF$_a$ compounds, respectively, and each of these novel compounds is accordingly useful for the above-described corresponding purposes, and is used for those purposes in the same manner as described above.

The known PGE and PGF$_a$ compounds are all potent in causing multiple biological responses even at low doses. For example, PGE$_2$ is extremely potent in causing vasodepression and smooth muscle stimulation, and also is potent as antilipolytic agents. However, for many applications, these known prostaglandins have an inconveniently short duration of biological activity. In striking contrast, the novel prostaglandin analogs of Formulas I and II are substantially more specific with regard to potency in causing prostaglandin-like biological responses, and have a substantially longer duration of biological activity. Therefore, each of these novel prostaglandin analogs is surprisingly and unexpectedly more useful than one of the corresponding above-mentioned known prostaglandins for at least one of the pharmacological purposes indicated above for the latter, and is surprisingly and unexpectedly more useful for that purpose because it has a different and narrower spectrum of biological activity than the known prostaglandin, and therefore is more specific in its activity and causes smaller and fewer undesired side effects than the known prostaglandin. Moreover, because of its prolonged activity, fewer and smaller doses of the novel prostaglandin analog can frequently be used to attain the desired result.

Another advantage of the novel compounds of this invention, compared with the known prostaglandins, is that these novel compounds are administered effectively orally, sublingually, intravaginally, buccally, or rectally, in addition to the usual intravenous, intramuscular, or subcutaneous injection or infusion methods indicated above for the uses of the known prostaglandins. These qualities are advantageous because they facilitate maintaining uniform levels of these compounds in the body with fewer, shorter, or smaller doses, and make possible self-administration by the patient.

The 15-methyl ether PGE$_2$- and PGF$_{2a}$-type compounds encompassed by Formulas I and II above are used for the purposes described above in the free acid form, in ester form, or in pharmacologically acceptable salt form. When the ester form is used, the ester is any of those within the above definition of R$_1$. However, it is preferred that the ester be alkyl of one to four carbon atoms, inclusive. Of those alkyl, methyl and ethyl are especially preferred for optimum absorption of the compound by the body or experimental animal system.

Pharmacologically acceptable salts of these Formula-I and -II compounds useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and aralipatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2 - amino - 2-ethyl-1,3-propanediol, 2-amino-2-methyl - 1-propanol, tris(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

As discussed above, the compounds of Formulas I and II are administered in various ways for various purposes; e.g., intravenously, intramuscularly, subcutaneously, orally, intravaginally, rectally, buccally, sublingually, topically, and in the form of sterile implants for prolonged action.

For intravenous injection or infusion, sterile aqueous isotonic solutions are preferred. For that purpose, it is preferred because of increased water solubility that $R_1$ in the Formula-I or -II compound be hydrogen or a pharmacologically acceptable cation. For subcutaneous or intramuscular injection, sterile solutions or suspensions of the acid, salt, or ester form in aqueous or non-aqueous media are used. Tablets, capsules, and liquid preparations such as syrups, elixirs, and simple solutions, with the usual pharmaceutical carriers are used for oral or sublingual administration. For rectal or vaginal administration, suppositories prepared as known in the art are used. For tissue implants, a sterile tablet or silicone rubber capsule or other object containing or impregnated with the substance is used.

The 15-methyl ether $PGE_2$ and $PGF_{2\alpha}$ type compounds encompassed by Formulas I and II are produced by the reactions and procedures described and exemplified hereinafter.

The Formula-I 15-methyl ether $PGE_2$-type compounds are prepared by the sequence of steps shown in Chart A, wherein Formulas III through V represent optically active compounds. The same sequence of steps is applicable to the racemic compounds consisting of the optically active compounds as depicted and the mirror images thereof. In Chart A, $R_2$ is hydrogen or alkyl of one to 8 carbon atoms; inclusive, and $R_3$ is alkyl of one to 8 carbon atoms, inclusive, e.g. methyl. Formulas IV and V, therefore, fall within the scope of Formula I.

The initial optically active reactants of Formula III in Chart A, i.e. $PGE_2$ and its alkyl esters, are known in the art or are prepared by methods known in the art. See, for example, Bergstrom et al., Pharmacol. Rev. 20, 1 (1968) and Corey et al., Journal of the American Chemical Society 92, 397 (1970). The initial racemic reactants represented by Formula III and the mirror image thereof, i.e. racemic $PGE_2$ and its alkyl esters, are known in the art or are prepared by methods known in the art. See, for example, Corey et al., Journal of the American Chemical Society 91, 5675 (1969) and Schneider et al., Chemical Communications (Great Britain) 304 (1969).

The various PGE-type 15-methyl ether analogs encompassed by Formula IV and its mirror image are prepared

CHART A

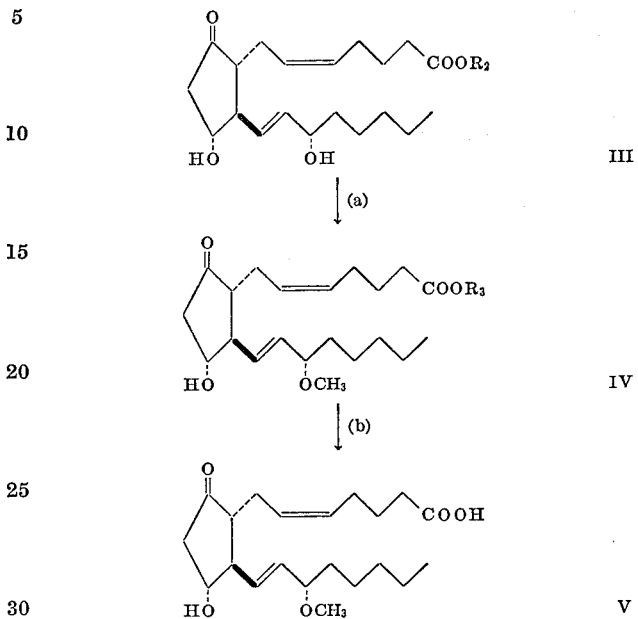

by partial methylation, with diazomethane, or $PGE_2$ or racemic $PGE_2$, or their alkyl esters so that the C-15 hydroxyls are thereby converted to 15-methyl ether groups. Generally, the free carboxyl groups are also esterified in this process, so that the methyl ester is produced rather than the free acid. When the Formula-V free acid is desired, as for the preparation of other esters or of the salts having pharmacologically acceptable cations, the methyl ester is subjected to enzymatic hydrolysis or other methods known in the art for converting esters to acids. Enzymatic hydrolysis is preferred in that it avoids degradative side reactions.

Impurities and unreacted starting material are separable from the desired 15-methyl ethers by methods known in the art, for example silica gel chromatography, including thin layer and column chromatography, and countercurrent distribution procedures. See Ramwell and Daniels, "Chromatography of the Prostaglandins" in "Lipid Chromatographic Analysis," Vol. 2, G. V. Marinetti, ed., Marcel Dekker, Inc., New York, 1969.

Diazomethane is a well-known reagent (see Fieser et al., "Reagents for Organic Synthesis," p. 191, John Wiley and Sons, Inc. (1967)) and may be prepared from a variety of nitroso compounds, e.g. N-methyl-N'-nitro-N-nitrosoquanidine. The methylation reaction is preferably done at about 25° C. Alternatively, the diazomethane is replaced with methanol and boron trifluoride or its etherate.

The Formula-II $PGF_{2\alpha}$-type 15-methyl ether compounds are prepared by the sequence of steps shown in Chart B, wherein Formulas VI through X represent optically active

CHART B

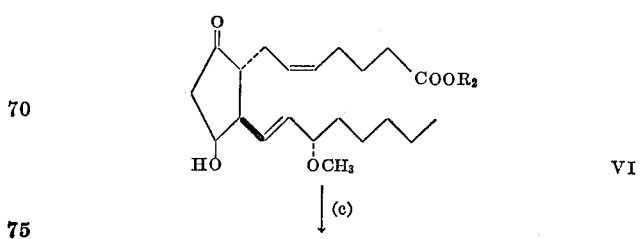

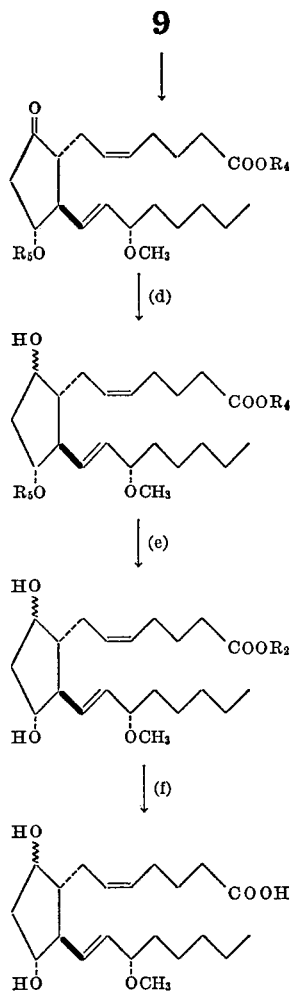

compounds. The same sequence of steps is applicable to the racemic compounds consisting of the optically active compounds as shown and the mirror images thereof. In Chart B, $R_2$ is as defined above; $R_4$ is hydrogen, alkyl of one to 8 carbon atoms, inclusive, or $(A)_3Si$—wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; and $R_5$ is hydrogen or $(A)_3Si$ as defined above. Formulas IX and X therefore, fall within the scope of Formula II.

The various $PGF_{2\alpha}$-type 15-methyl ether compounds encompassed by Formula IX are prepared by carbonyl reduction of $PGE_2$, 15-methyl ether, or racemic $PGE_2$, 15-methyl ether, or their alkyl esters, thereby transforming the 9-oxo groups of those $PGE_2$-type compounds to 9-hydroxy groups. Generally, compounds having either $9\alpha$- or $9\beta$-hydroxy groups are thereby formed, so that the $9\alpha$-hydroxy products are preferably separated from the reaction mixture, e.g. by silica gel chromatography.

Although the Formula-VI compounds, and their racemic compounds with mirror images thereof, may be reduced directly to the corresponding Formula-IX compounds, it is preferred for a high ratio of the $PGF_{2\alpha}$-type compounds over the co-formed $PGF_{2\beta}$ compounds that the 11-hydroxy groups be transformed to $(A)_3$—Si—O— moieties by silylation prior to the reduction step. The various A's of a —Si—$(A)_3$ moiety are alike or different. For example, —Si—$(A)_3$ can be trimethylsilyl, dimethylphenylsilyl, or methylphenylbenzylsilyl.

Referring to Chart B, the Formula-VII and -VIII compounds may be esters, i.e. where $R_2$ of the Formula-VI compound is alkyl, $R_4$ is also alkyl; acids, i.e. derived from acid-form Formula-VI compounds without silylation, whereby $R_4$ is hydrogen; or silylated, whereby $R_4$ is $(A)_3$—Si— as above defined. If, as is preferred, the Formula-VI compounds are subjected to silylation prior to reduction, $R_5$ is $(A)_3$—Si—; if not silylated, $R_5$ is hydrogen.

Silylation is accomplished by procedures known in the art. See, for example, Pierce, "Silylation of Organic Compounds," Pierce Chemical Co., Rockford, Ill. (1968). Sufficient silylating agent is used to transform the 11-hydroxy groups to $(A)_3$—Si—O— moieties. As to the silylating agents known in the art, see, for example, Post, "Silicones and Other Organic Silicon Compounds," Reinhold Publishing Corp., New York, N.Y. (1949).

When the acid-form Formula-VI compounds are used, excess silylating agent and prolonged treatment also transforms the —COOH to —COO—Si—$(A)_3$. It is optional whether or not the —COOH of the Formula-VI reactants is esterified to —COO—SI—$(A)_3$.

Referring again to Chart B, in the preferred process the mono- or disilylated Formula-VII $PGE_2$-type intermediates are reduced to the corresponding silylated Formula-VIII $PGF_2$-type compounds. These ring carbonyl reductions are carried out by methods known in the art. See, for example. Bergstrom et al., Arkiv Kemi, 19, 563 (1963) and Acta Chem. Scand. 16, 969 (1962), and British specification No. 1,097,533. Use is made of any of the known ketonic carbonyl reducing agents which do not reduce ester or acid groups or carbon-carbon double bonds when the latter is undesirable. Preferred reagents reagents are lithium (tri-tert-butoxy)aluminum hydride, the metal borohydrides, especially sodium, potassium, and zinc borohydrides, and the metal trialkoxy borohydrides, e.g. sodium trimethoxyborohydride.

Following the reduction, the silylated Formula-VIII $PGF_2$-type intermediates are hydrolyzed to the corresponding Formula-IX compounds wherein $R_4$ and $R_5$ silyl groups are replaced with hydrogen. These hydrolyses are carried out by prior art procedures known to be useful for transforming silyl ethers and silyl esters to alcohols and carboxylic acids, respectively. See, for example, Pierce, cited above, especially p. 447 thereof. A mixture of water and sufficient of a water-miscible organic diluent to give a homogeneous hydrolysis reaction mixture represents a suitable reaction medium. Addition of a catalytic amount of an organic or inorganic acid hastens the hydrolysis. The length of time required for the hydrolysis is determined in part by the hydrolysis temperature. With a mixture of water and methanol at 25° C., several hours is usually sufficient for hydrolysis. At 0° C., several days is usually necessary.

The mixtures of $PGF_2$-type alpha and beta hydroxy reduction products are separated into the individual Formula-IX alpha and beta isomers by methods known in the art for the separation of analogous pairs of known isomeric prostanoic acid derivatives. See, for example, Bergstrom et al., cited above, Granstrom et al., J. Biol. Chem. 240, 457 (1965), and Green et al., J. Lipid Research 5, 117 (1964). Especially preferred as separation methods are partition chromatographic procedures, both normal and reversed phase, preparative thin layer chromatography, and countercurrent distribution procedures.

The Formula-IV $PGE_2$-type and the Formula-IX $PGF_{2\alpha}$-type compounds shown in Charts A and B include $R_2$ or $R_3$ carboxylic acid esters, wherein $R_2$ and $R_3$ are as defined above. For some of the uses describd above, it is prefered that the novel Formula-I and -II 15-methyl ether PG-type compounds of this invention be in free acid form, or in salt form which requires the free acid as a starting material. The $PGF_2$-type esters of Formula IX are easily hydrolyzed or saponified to the free acids by the usual known procedures, especially when $R_2$ is alkyl of one to 4 carbons, inclusive, preferably methyl or ethyl.

On the other hand, the $PGE_2$-type esters of Formula IV are difficult to hydrolyze or saponify without causing unwanted structural changes in the desired acids. The PGE$_2$-type free acids of Formula V are obtained on oxidation of the corresponding Formula-X PGF$_{2\alpha}$-type free acid compounds. Oxidation reagents useful for this transformation are known to the art. An especially useful reagent for this purpose is the Jones reagent, i.e., acidified chromic acid. See J. Chem. Soc. 39 (1946). Acetone is a suitable diluent for this purpose, and a slight excess beyond the amount necessary to oxidize one of the secondary hydroxy groups of the Formula-V reactant is used. Reaction temperatures at least as low as about 0° C. should be used. Preferred reaction temperatures are in the range —10° to —50° C. The oxidation proceeds rapidly and is usually complete in about 5 to 20 minutes. The excess oxidant is destroyed, for example by addition of a lower alkanol, advantageously, isopropyl alcohol, and the Formula-V PGE$_2$-type product is isolated by conventional methods.

Examples of other oxidation reagents useful for this transformation are silver carponate on Celite (Chem. Commun. 1102 (1969)), mixtures of chromium trioxide and pyridine (Tetrahedron Letters 3363 (1968), J. Am. Chem. Soc. 75, 422 (1953), and Tetrahedron, 18, 1351 (1962)), mixtures of sulfur trioxide in pyridine and dimethyl sulfoxide (J. Am. Chem. Soc. 89, 5505 (1967)), and mixtures of dicyclohexylcarbodiimide and dimethyl sulfoxide (J. Am. Chem. Soc. 87, 5661 (1965)).

An alternate procedure to make the free acid forms of the Formula-V PGE$_2$-type compounds is as follows. This procedure comprises subjecting the alkyl ester corresponding to Formula IV to the acylase enzyme system of a microorganism species of Subphylum 2 of Phylum III, and thereafter isolating the acid. Especially preferred for this purpose are species of the orders Mucorales, Hypocreales, Moniliales, and Actinomycetales. Also especially preferred for this purpose are species of the families Mucoraceae, Cunninghamellaceae, Nectreaceae, Moniliaceae, Dematiaceae, Tuberculariaceae, Actinomycetaceae, and Streptomycetaceae. Also especially preferred for this purpose are species of the genera Absidia, Circinella, Gongronella, Rhizopus, Cunninghamella, Calonectria, Aspergillus, Penicillium, Sporotrichum, Cladosporium, Fusarium, Nocardia, and Streptomyces. Examples of microorganisms falling within the scope of those preferred orders, families, and genera are listed in U.S. Pat. No. 3,290,226.

This enzymatic ester hydrolysis is carried out by shaking the Formula-IV alkyl ester in aqueous suspension with the enzyme contained in a culture of one of the abovementioned microorganism species until the ester is hydrolyzed. A reaction temperature in the range 20° to 30° C. is usually satisfactory. A reaction time of one to 20 hours is usually sufficient to obtain the desired hydrolysis. Exclusion of air from the reaction mixture, for example, with argon or nitrogen is usually desirable.

The enzyme is obtained by harvest of cells from the culture, followed by washing and resuspension of the cells in water, and cell disintegration, for example, by stirring with glass beads or by sonic or untrasonic vibrations. The entire aqueous disintegration mixture is used as a source of the enzyme. Alternatively and preferably, however, the cellular debris is removed by centrifugation on filtration, and the aqueous supernatant or filtrate is used.

In some cases, it is advantageous to grow the microorganism culture in the presence of an alkyl ester of an aliphatic acid, said acid containing 10 to 20 carbon atoms, inclusive, and said alkyl containing one to 8 carbon atoms, inclusive, or to add such an ester to the culture and maintain the culture without additional growth for one to 24 hours before cell harvest. Thereby, the enzyme produced is sometimes made more effective in transforming the Formula-IV ester to the free acid. An example of a useful alkyl ester for this purpose is methyl oleate.

This enzymatic hydrolysis is also applicable to the Formula-IX PGF$_2$-type alkyl esters.

When a Formula-I or -II 15-methyl ether PG-type acid has been prepared and an alkyl ester is desired, esterification is advantageously accomplished by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably ethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

The final Formula-I and -II compounds prepared by the processes of this invention, in free acid form, are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the Formula-V or -X acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt. Evaporation of the water or addition of a water-miscible solvent of moderate polarity, for example, a lower alkanol or a lower alkanone, gives the solid inorganic salt if that form is desired.

To produce an amine salt, the Formula-V or -X acid is dissolved in a suitable solvent of either moderate or low polarity. Examples of the former are ethanol, acetone, and ethyl acetate. Examples of the latter are ethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the Formula-V or -X acid with the stoichiometric amount of the corresponding quaternary ammonium hydroxide in water solution, followed by evaporation of the water.

The invention can be more fully understood by the following examples.

All temperatures are in degrees centigrade.

Infrared absorption spectra are recorded on a Perkin-Elmer Model 421 infrared spectrophotometer. Except when specified otherwise, undiluted (neat) samples are used.

N.M.R. spectra are recorded on a Varian A-60 spectrophotometer on deuterochloroform solutions with tetramethylsilane as an internal standard (downfield).

Mass spectra are recorded on an Atlas CH-4 mass spectrometer with a TO-4 source (ionization voltage 70 e.v.).

"Brine," herein, refers to an aqueous saturated sodium chloride solution.

DESCRIPTION OF THE PREFERRED EMBODIMENTS

*Example 1.*—$PGE_2$, Methyl Ester, 15-Methyl Ether
(Formula I: $R_1$ is methyl)

Refer to Chart A, step a. A solution of $PGE_2$ (16 g.) in 150 ml. of dichloromethane is treated at about 25° C. with an ether solution of diazomethane prepared from N-methyl-N'-nitro-N-nitrosoquanidine (see Fieser et al., "Reagents for Organic Synthesis," p. 192, John Wiley & Sons, Inc., New York, N.Y. (1967)), until the bright yellow diazomethane color persists for 10 min.

Excess diazomethane is destroyed with a few drops of acetic acid and the solvent is removed under reduced pressure. The residue is separated into components by silica gel chromatography. Those fractions shown to contain the title compound free of the methyl ester of the starting compound and by-products by thin layer chromatography (TLC) are combined to yield the Formula-I title compound.

Following the procedure of Example 1, but replacing $PGE_2$ with the methyl ester of $PGE_2$, there is obtained $PGE_2$, methyl ester, 15-methyl ether. Likewise the ethyl, isopropyl, butyl, and octyl esters of $PGE_2$ are converted to the isopropyl, butyl, and octyl esters of $PGE_2$, 15-methyl ether, respectively.

Likewise following the procedure of Example 1, but replacing $PGE_2$ with racemic $PGE_2$, there is obtained racemic $PGE_2$, methyl ester, 15-methyl ether. Likewise the methyl, ethyl, isopropyl, butyl, and octyl esters of racemic $PGE_2$ yield the corresponding methyl, ethyl, isopropyl, butyl, and octyl esters of racemic $PGE_2$, 15-methyl ether.

*Example 2.*—$PGF_{2\alpha}$, Methyl Ester, 15-Methyl Ether
(Formula II: $R_1$ is methyl)

Refer to Chart B, steps c, d, and e. A solution of $PGE_2$, methyl ester, 15-methyl ether (Example 1, 1.0 g.) in 20 ml. of dry tetrahydrofuran (THF) is stirred with 3 ml. of hexamethyldisilazane and 0.6 ml. of trimethyl chlorosilane for 20 hrs. at about 25° C., with protection from moisture. The mixture is concentrated under reduced pressure, then taken up in 50 ml. of dry benzene and again concentrated. The residue is dissolved in 150 ml. of cold methanol and treated, with stirring, with a cold (−10° C.) solution of sodium borohydride (2.8 g.) in 150 ml. of methanol, maintaining the temperature below about 10° C. After 10 minutes of additional stirring, there is added 5 ml. of acetone and sufficient acetic acid to neutralize the mixture. The mixture is concentrated under reduced pressure to about 75 ml. and water (about 75 ml.) is added to hydrolyze the trimethylsilyl groups, thereafter stirring at about 25° C. for 3 hrs. When the trimethylsilyl groups are removed, as shown by TLC, the mixture is concentrated under reduced pressure to remove most of the methanol. The remaining solution is extracted with ethyl acetate, and the combined ethyl acetate extracts are washed with brine, dried over anhydrous magnesium sulfate, and concentrated under reduced pressure. The residue is taken up in a minimum amount of dichloromethane and subjected to silica gel chromatography, eluting with 50–100% ethylacetate-Skellysolve B (isomeric hexanes). Those fractions shown to contain the 9α-hydroxy title compound free of starting compound and by-products by TLC are combined to yield the Formula-II title compound. Mass spectral peaks at 382, 364, 350, 346 and 332; infrared spectral absorptions at 3410, 1735, 1660, 1435, 1365, 1315, 1240, 1215, 1195, 1170, 1090, and 970 cm.$^{-1}$; nuclear magnetic resonance (NMR) peaks at 5.42 (multiplet), 3.9 (multiplet), 3.64, 3.49, 3.21 and 0.9 (triplet) δ.

Following the procedures of Example 2, but replacing $PGE_2$, methyl ester, 15-methyl ether with $PGE_2$, 15-methyl ether (Example 6 below), there is obtained $PGF_{2\alpha}$, 15-methyl ether. Likewise, each of the esters of $PGE_2$, 15-methyl ether, described following Example 1 yields the corresponding ester of $PGF_{2\alpha}$, 15-methyl ether.

Likewise following the procedures of Example 2, but replacing $PGE_2$, methyl ester, 15-methyl ether, with racemic $PGE_2$, methyl ester, 15-methyl ether, there is obtained racemic $PGF_{2\alpha}$, methyl ester, 15-methyl ether. Likewise the racemic compounds of $PGE_2$, 15-methyl ether, and the esters described following Example 1 yield the corresponding racemic $PGF_{2\alpha}$-type 15-methyl ether compounds.

*Example 3.*—$PGF_{2\alpha}$, Methyl Ester, 15-Methyl Ether
(Formula II: $R_1$ is methyl)

A solution of $PGF_{2\alpha}$, methyl ester (1.0 g.) in 20 ml. of methanol is treated with boron trifluoride etherate (0.25 ml.) at about 25° C. and left standing for 1 hr. Water (about 10 ml.) is added and the mixture is concentrated under vacuum to remove most of the methanol. The residue is extracted with ethyl acetate and the combined ethyl acetate extracts are washed with brine, dried over anhydrous magnesium sulfate, and concentrated under reduced pressure. The residue is taken up in a small amount of dichloromethane and separated by silica gel chromatography, following the procedure of Example 2, to yield the Formula-II title compound, having the same properties as the product of Example 2.

Following the procedure of Example 3, but replacing $PGF_{2\alpha}$, methyl ester, with the ethyl, propyl, isobutyl, and heptyl esters of $PGF_{2\alpha}$, there are obtained the corresponding ethyl, propyl, isobutyl, and heptyl esters of $PGF_{2\alpha}$, 15-methyl ether.

Likewise following the procedure of Example 3, but replacing $PGF_{2\alpha}$, methyl ester, with racemic $PGF_{2\alpha}$, methyl ester, there is obtained racemic $PGF_{2\alpha}$, methyl ester, 15-methyl ether. Likewise the ethyl, propyl, isobutyl, and heptyl esters of racemic $PGF_{2\alpha}$ yield the corresponding esters of racemic $PGF_{2\alpha}$, 15-methyl ether.

*Example 4.*—$PGF_{2\alpha}$, 15-Methyl Ether (Formula II: $R_1$ is hydrogen)

Refer to Chart B, step f. A solution of $PGF_{2\alpha}$, methyl ester, 15-methyl ether (Example 2, 0.15 g.) in a mixture of methanol (4.5 ml.) and water (1.5 ml.) is cooled to 5° C. and 0.6 ml. of 45% aqueous potassium hydroxide is added. The mixture is left standing 3.5 hrs. at about 25° C., then is diluted with 75 ml. of water and extracted with ethyl acetate to remove any neutral material. The aqueous layer is acidified with dilute hydrochloric acid and extracted several times with ethyl acetate. The combined ethyl acetate extracts are washed with water and brine, dried over sodium sulfate, and evaporated to give the Formula-II title compound. Mass spectral peaks at 353, 350, 336, 318, 300, 264 and 261; infrared spectral absorptions at 3420, 2950, 2720, 2660, 1715, 1680, 1330, 1270, 1205, 1130, 1075, 980, and 925 cm.$^{-1}$.

Following the procedure of Example 4, each of the esters of $PGF_{2\alpha}$, 15-methyl ether, described following Example 3, as well as each of the esters of racemic $PGF_{2\alpha}$, 15-methyl ether, is saponified to yield the corresponding $PGF_{2\alpha}$, 15-methyl ether, or racemic $PGF_{2\alpha}$, 15-methyl ether.

*Example 5.*—$PGE_2$, 15-Methyl Ether (Formula I: $R_1$ is hydrogen

A solution of $PGF_{2\alpha}$, 15-methyl ether, (0.1 g.) in 40 ml. of acetone is cooled to −10° C. To it is added 110% of the theoretical amount of Jones reagent (in the proportions of 21 g. of chromic anhydride, 60 ml. of water, and 17 ml. of concentrated sulfuric acid), precooled to 0° C., with vigorous stirring. After about 10 min., isopropyl alcohol (1 ml.) is added to the cold reaction mixture.

After 5 min., the mixture is filtered and the filtrate is concentrated under reduced pressure. The residue is mixed with 5 ml. of brine and the mixture is extracted several times with ethyl acetate. The combined ethyl acetate extracts are washed with brine, dried with anhydrous sodium sulfate, and concentrated under reduced pressure. The residue is subjected to silica gel chromatography, eluting with 50-100% ethyl acetate-Skellysolve B. Those fractions shown by TLC to contain the desired product are combined and concentrated to yield the Formula-I title compound. Mass spectral peaks at 348, 334, 330, 316, 298, and 277; infrared spectral absorptions at 3420, 3200 (broad), 2650, 1735, 1710, 1285, 1240, 1155, 1085, 1075, and 970 cm.$^{-1}$.

Following the procedure of Example 5 but replacing $PGF_{2\alpha}$, 15-methyl ether, with racemic $PGF_{2\alpha}$, 15-methyl ether, there is obtained racemic $PGE_2$, 15-methyl ether.

*Example 6.*—Enzymatic Hydrolysis of $PGE_2$, Methyl Ester, 15-Methyl Ether

A. Enzyme preparation (Chart A, step b)

A medium is prepared consisting of 2% corn steep liquor (a mixture of equal parts of cerelose and glucose) in tap water. This is brought to pH 4.5 by adding hydrochloric acid, and 1% of methyl oleate is added. Four 500 ml. flasks each containing 100 ml. of the above medium are inoculated with *Cladosporium resinae* (C1-11, ATCC 11,274; and are placed on a shaker at room temperature (about 28° C.) for 4 days. The culture is then placed in 40 ml. centrifuge tubes and centrifuged at about 2000 r.p.m. in a clinical centrifuge. The liquid is decanted from the centrifuge tubes and the collected cells are washed with cold water. The washed cells from 2 centrifuge tubes are suspended in 50 ml. of ice cold 0.05 M pH 7.0 phosphate buffer and placed in small Waring blender cup chilled with ice. Glass beads are added and the suspended cells are churned in the blender for 15 minutes. The resulting suspension of broken cells is centrifuged in a clinical centrifuge at about 2000 r.p.m. for 15 minutes at room temperature, then the supernatant liquid is collected. This supernatant liquid contains *Cladosporium resinae* acylase and is used directly for the hydrolysis of alkyl esters or is stored, preferably frozen, until needed.

B. Esterase hydrolysis

Ten milliliters of the supernatant liquid containing *Cladosporium resinae* acylase, prepared as described in part A of this example and 50 mg. of $PGE_2$, methyl ester, 15-methyl ether, are shaken at room temperature under nitrogen for about 19 hours, then 70 ml. of acetone is added and the mixture is filtered giving a filtrate and an insoluble residue. The filtrate is evaporated under reduced pressure. The residue is chromatographed over 10 g. of acid-washed silica gel (Silicar CC-4, Mallinckrodt), eluting with mixed hexanes (Skellysolve B) containing increasing amounts of ethyl acetate, collecting 50 ml. fractions. Those fractions containing $PGE_2$, 15-methyl ether (Formula I wherein $R_1$ is hydrogen), are combined and evaporated to yield the product.

Following the procedure of Example 6, each of the specific methyl, ethyl, and other alkyl esters defined above in and after Examples 1-3 is hydrolyzed enzymatically to the corresponding 15-methyl ether prostaglandin-like free acid.

*Example 7.*—$PGE_2$, Ethyl Ester, 15-Methyl Ether. (Formula I: $R_1$ is ethyl)

A solution of diazoethane (about 0.1 g.) in diethyl ether (25 ml.) is added to a solution of $PGE_2$, 15-methyl ether, (50 mg.) in 25 ml. of diethyl ether. The mixture is allowed to stand at 25° C. for 5 minutes. Then, the mixture is evaporated to give the Formula-I title compound.

Following the procedure of Example 7, $PGF_{2\alpha}$, 15-methyl ether, is converted to the corresponding ethyl ester.

Also following the procedure of Example 7, but using in place of the diazoethane, diazobutane, 1-diazo-2-ethylhexane, and diazocyclohexane, there are obtained the corresponding butyl, 2-ethylhexyl, and cyclohexyl esters of $PGE_2$, 15-methyl ether. In the same manner, $PGF_{2\alpha}$, 15-methyl ether, is converted to the corresponding butyl, 2-ethylhexyl, and cyclohexyl esters.

*Example 8.*—$PGE_2$, 15-Methyl Ether, Sodium Salt (Formula I: $R_1$ is sodium)

A solution of $PGE_2$, 15-methyl ether, (100 mg.) in 50 ml. of a water-ethanol mixture (1:1) is cooled to 5° C. and neutralized with an equivalent amount of 0.1 N aqueous sodium hydroxide solution. The neutral solution is evaporated to give the Formula-I title compound.

Following the procedure of Example 8 but using potassium hydroxide, calcium hydroxide, tetramethylammonium hydroxide, and benzyltrimethylammonium hydroxide in place of sodium hydroxide, there are obtained the corresponding salts of $PGE_2$, 15-methyl ether.

Also following the procedure of Example 8, $PGF_{2\alpha}$, 15-methyl ether, is transformed to the sodium, potassium, calcium, tetramethylammonium, and benzyltrimethylammonium salts.

I claim:
1. An optically active compound of the formula

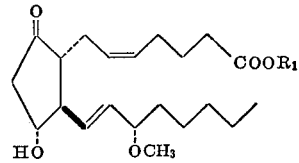

or a racemic compound of that formula and the mirror image thereof, wherein $R_1$ is hydrogen, alkyl of one to 8 carbon atoms, inclusive, or a pharmacologically acceptable cation.

2. A compound according to claim 1 wherein $R_1$ is hydrogen.

3. A compound according to claim 1 wherein $R_1$ is methyl.

4. $PGE_2$, methyl ester, 15-methyl ether, an optically active compound according to claim 1 wherein $R_1$ is methyl.

References Cited

Bundy et al., Prostaglandin Symposium, Sept. 17, 1970, pp. 84-85.

McComie, Advances in Organic Chemistry, 3, 216-221 (1963).

ROBERT GERSTL, Primary Examiner

U.S. Cl. X.R.

260—211 R, 247.2 R, 268 R, 293.65, 326.3, 439.9, 43 R, 448 R, 448.2 R, 501.1, 501.15, 501.17, 501.2, 514 D